May 17, 1960  W. J. CROWE  2,937,346
NONRECIPROCAL WAVE TRANSMISSION
Filed May 7, 1957
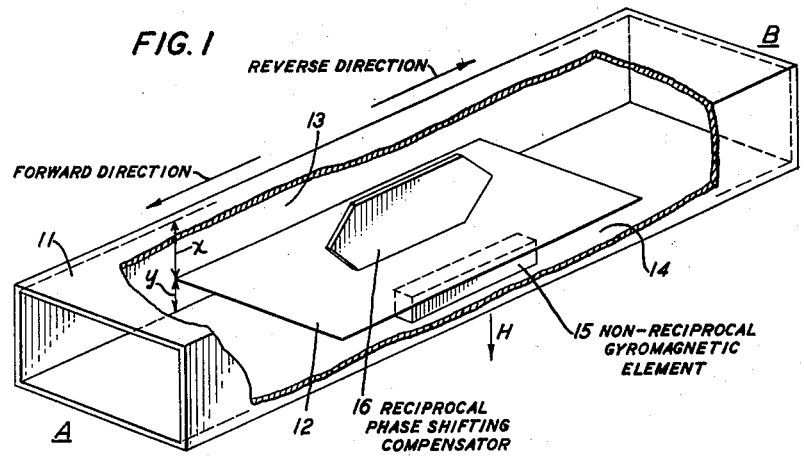
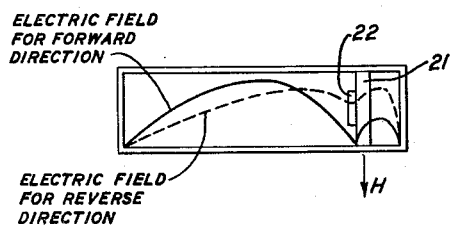
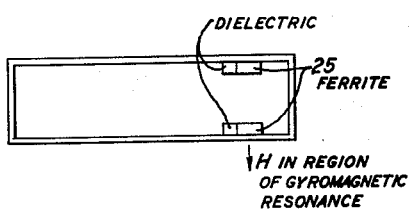
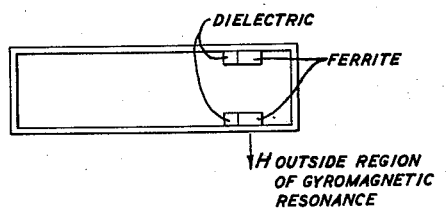
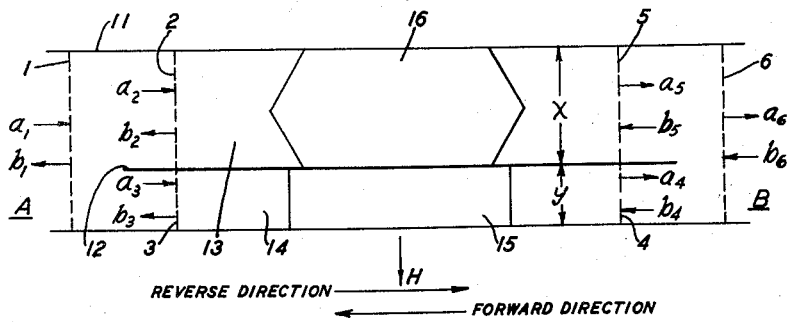
INVENTOR
W. J. CROWE
BY
ATTORNEY

United States Patent Office 2,937,346
Patented May 17, 1960

2,937,346

NONRECIPROCAL WAVE TRANSMISSION

William J. Crowe, Hanover Township, Morris County, N.J., assignor to Bell Telephone Laboratories, Incorporated, New York, N.Y., a corporation of New York Application May 7, 1957, Serial No. 657,677

11 Claims. (Cl. 333—31)

This invention relates to nonreciprocal components for electromagnetic wave transmission systems and, more particularly, to nonreciprocal attenuating devices and nonreciprocal phase shifting devices employing gyromagnetic materials.

The microwave transmission art has benefited considerably from the many gyromagnetic devices introduced in the recent past. These gyromagnetic devices provide, in a simple manner, nonreciprocal effects based upon the birefringent properties exhibited by certain gyromagnetic materials such as the broad class known as ferrites. One very valuable class of devices of this type is known as the isolator. An isolator is defined as a device which may be employed to isolate an electromagnetic device from other portions of an electromagnetic wave system, in the sense that waves may be freely transmitted in the direction from the device through the isolator to the system, designated the forward or low loss direction, but waves originating outside of the device and traveling in the opposite direction, designated the reverse or high loss direction, are attenuated by the isolator to the extent required to prevent deleterious reaction of the system upon the device to be isolated. Needless to say the greater the attenuation in the reverse or high loss direction the better; the smaller the attenuation in the forward or low loss direction the better. A useful figure of merit has been devised called the "loss ratio" which is the reverse insertion loss, desirably provided by the isolator, divided by the forward insertion loss, undesirably provided by the isolator.

The class of gyromagnetic isolators comprises two major categories, namely, the gyromagnetic resonance-type isolator and the field displacement-type isolator. Improved variations of isolators of each of these types, which at this time are well known in the art, are definitively disclosed respectively in copending applications by M. T. Weiss, Serial No. 549,795, filing date November 29, 1955 and S. Weisbaum, Serial No. 503,678, filing date April 25, 1955, now United States Patent 2,834,947 issued May 13, 1958. Both the resonance and field displacement isolators have satisfied a long standing need in the art. The maximum loss ratios obtained by the isolators described in the above-mentioned copending applications are somewhat greater than 150 to 1 but less than 200 to 1. However, an ideal isolator would provide an infinite loss in the reverse direction and zero loss in the forward direction. This ideal has not been closely reached by the gyromagnetic isolators mentioned above. This is understandable in view of the fact that the elimination of loss in the forward direction is limited by the unavoidable inherent reciprocal loss which energy suffers when propagating through ferrite material. Furthermore, the loss in the reverse direction is limited by the magnitude of the nonreciprocal loss of the ferrite material which for given sized ferrite elements has certain upper limits. In general, attempts to increase the loss ratio by increasing the reverse loss result in an increase in the forward loss, while decreasing the forward loss results in decreasing the reverse loss.

It is therefore an object of this invention to provide an isolator having a ratio of reverse to forward loss infinite in magnitude.

It is a further object of this invention to achieve a substantially infinite reverse loss coupled with a loss in the forward direction smaller than has heretofore ever been attained.

In accordance with the invention these objects are achieved in a microwave guiding structure which may incorporate either a field displacement or gyromagnetic resonance attenuator. In accordance with one embodiment of the invention a rectangular metallic wave guide is bifurcated by a thin conductive septum which is perpendicular to the electric vectors of the dominant mode supported by the wave guide. The wave guide is thus divided into two reduced height wave guide sections having the conductive septum as a common wide wall. Dominant mode energy propagating in the wave guide will, upon reaching the bifurcating septum be divided into two portions. Each portion progapates in one of the reduced height sections as a dominant mode with an amplitude dependent upon the relative heights of the two reduced height sections. In one of the reduced height sections there is included a nonreciprocal attenuator which may be of either the resonance or field displacement type. Thus the attenuator loaded wave guiding section on one side of the conductive septum may be viewed as being bridged by the wave guiding section on the other side of the septum, with the length of the bridging path being determined by the conductive septum. A similar arrangement is disclosed in United States Patent 2,866,-949 issued on December 30, 1958 to L. C. Tillotson. However, it has been discovered that by inducing multiple reflections at each end of the conductive septum the "loss ratio" of ferrite isolators may be substantially improved. In particular, it has been discovered that in such an arrangement the parameters of the structure may be proportioned such that energy initially propagating in the reverse direction will, after propagating past the attenuator, be redistributed between the two sections and completely reflected at one end of the conductive septum, will be similarly redistributed and completely reflected when reaching the other end of the conductive septum and will thus, in general, undergo an almost infinite series of reflections from each end of the septum. Thus the energy propagates past the nonreciprocal attenuator in the lossy direction enough times such that no energy initially propagating in the reverse direction will exit from the isolator, that is, infinite attenuation is achieved for the reverse direction of propagation. The controlling parameters involved in this effect are the relative heights of the reduced height sections, the reciprocal phase shift in the ferrite-free section, the phase shift and attenuation in the ferrite loaded section for the reverse direction, and the phase shift and attenuation in the ferrite loaded section for the forward direction of propagation. The necessary interrelationship of these parameters will hereinafter be discussed in detail.

The isolator is proportioned such that the phase shift in each of the reduced height sections is the same, but solely for the forward direction of propagation. This may be accomplished by loading the ferrite-free or bridging section with an element of dielectric material to compensate for the inherent reciprocal phase shift of the ferrite in the ferrite loaded section. Therefore, energy initially propagating in the forward direction is always in phase in both the reduced height wave guide sections and consequently exits the isolator without any reflections whatever and thus with a minimum loss. This loss is less than has heretofore ever been achieved. This may be understood by recalling the fact that the energy on reaching the conductive septum is divided into two portions which propagate through the two reduced height sections respectively. As a consequence, only a portion of the energy initially incident in the forward direction can be effected by the reciprocal loss inherent in the ferrite attenuator. Therefore less loss results in the forward direction than can be achieved with the conductive septum absent. The amount of reduction of loss in the forward direction is dependent upon the relative heights of the two reduced height wave guide sections.

From the above qualitative description of the invention it may be seen that complete reverse attenuation can be achieved with a relatively small length of nonreciprocal element, i,e,. with a fairly small piece of ferrite. In the prior art devices, the achievement of a reverse loss of this magnitude would require the use of an extremely long ferrite element either for resonance or field displacement purposes with a concomitant increase in forward loss. Thus, one of the subsidiary but highly beneficial features of the invention is that small ferrite elements may be utilized and as a consequence small and simple magnetic biasing equipment may be employed. The saving in space thus made feasible by the invention is a valuable physical benefit in applications of the invention wherein whole systems must be incorporated in limited physical locations.

Another important microwave device is the nonreciprocal phase shifter. The principles of the invention are also advantageously applied to this class of microwave devices. Nonreciprocal phase shifters are an essential feature of the very important class of devices generically known as microwave gyrators, an example of which is described in "The Microwave Gyrator," Bell System Technical Journal, by C. L. Hogan, January 1952, pages 1 through 31. When the gyrator is used to perform the function of a circulator many of the practical advantages of isolator action are achieved without dissipation of any wave energy. A nonreciprocal phase shifter performing the function of a gyrator provides a 180-degree nonreciprocal phase shift, i.e., a 180-degree excess phase shift for one direction of propagation with a zero excess phase shift for the opposite direction of propagation.

Recognizing the important requirement that microwave devices occupy a minimum amount of physical space, it is a further object of the invention to provide nonreciprocal phase shift in gyromagnetic devices over a minimum physical distance.

In accordance with the invention this object is achieved in a structure very similar to the physical arrangement described above for the isolator. However, rather than having a nonreciprocal attenuator in one of the two reduced height wave guides, a nonreciprocal phase shifter is located therein instead. Thus an element of gyromagnetic material transversely offset from the center line of the guide may be biased, in a manner well known in the art, outside the region of gyromagnetic resonance. The length and other parameters of the ferrite may be such that a given amount of nonreciprocal phase shift is provided. However, because of the relationship of several of the parameters previously mentioned, multiple reflections for the reverse direction of propagation may be achieved such that the overall phase shift in the reverse direction is substantially in excess of the phase shift that would be achieved with a single pass through the phase shifter. Thus, for example, a gyromagnetic phase shifter ordinarily capable of producing a nonreciprocal phase shift of $\delta$, less than 180 degrees, when introduced into the bifurcated microwave circuit, will result in an overall excess phase shift of $\delta'$, equal to 180 degrees, for the overall microwave circuit. In this manner a microwave gyrator is accomplished with a gyromagnetic element which is ordinarily capable of producing phase shift less than 180 degrees.

Other objects and certain features and advantages of the invention will become apparent during the course of the following detailed description of the specific illustrative embodiments of the invention shown in the accompanying drawings.

In the drawings:

Fig. 1 is a perspective view by way of example, for purposes of illustration, of a nonreciprocal microwave circuit in accordance with the invention;

Fig. 1A is a cross sectional view of a field displacement nonreciprocal attenuator which may be incorporated in the structure of Fig. 1;

Fig. 1B is a cross sectional view of a gyromagnetic resonance-type nonreciprocal attenuator which may be incorporated in the structure of Fig. 1;

Fig. 1C is a cross sectional view of a nonreciprocal gyromagnetic phase shifter which may be incorporated in the structure of Fig. 1; and Fig. 2 is a longitudinal cross section of the device of Fig. 1 wherein certain reference planes are incorporated for purposes of explanation and exposition.

Fig. 1 is an illustrative embodiment of a nonreciprocal microwave circuit in accordance with the invention, given by way of example, which is employed as an isolator. A rectangular wave guide 11 of the hollow metallic shield type is represented having a pair of parallel wide walls and a pair of parallel narrow walls. Wave guide 11 is proportioned in a manner well known in the art to support the dominant mode in rectangular guides to the exclusion of higher order modes at the operating frequency. The dominant or $TE_{10}$ mode in rectangular guides would thus have the electric lines of force parallel to the narrow walls and perpendicular to the wider walls of wave guide 11. Extending within a portion of wave guide 11, a thin longitudinal conductive septum 12 is disposed parallel to the wider walls and extends in a transverse direction completely across guide 11 from one narrow wall to the other. Septum 12 thus bifurcates wave guide 11 into two reduced height wave guide sections. The upper section is designated 13 and the lower section is designated 14. It may be seen that sections 13 and 14 are each rectangular wave guides having parallel wide and narrow walls and wherein sections 13 and 14 share the conductive septum 12 as a common wide wall. Sections 13 and 14, however, are wave guides having reduced heights, i.e., the dimensions of the narrow walls of each of sections 13 and 14 are less than the dimension of the narrow wall of guide 11. The sum of the dimensions of the narrow walls of guides 13 and 14 equals the dimension of the narrow wall of guide 11. The distance $x$, relative to section 13, designates the fraction of the narrow wall of guide 11 which is accounted for by the narrow wall of guide 13. Similarly $y$ designates the fraction of the narrow wall of guide 11 occupied by the narrow wall of guide 14. It may be seen therefore that $x+y$ is equal to 1 where the narrow dimension of guide 11 is considered unity.

Dominant mode wave energy entering wave guide 11 at end A on the left thereof and propagating to the right toward end B thereof, henceforth to be called the reverse direction of propagation, will, upon encountering the left hand edge of septum 12, be divided into two dominant modes with one portion of the energy propagating as a dominant mode in section 13 and the other portion of the energy propagating as a dominant mode in section 14. The relative division of the wave energy propagating in sections 13 and 14 will, of course, be a function of the values $x$ and $y$. Energy entering wave guide 11 on the right from end B, and propagating to the left, to end A, henceforth to be called the forward direction of propagation, will similarly be divided into two dominant modes between sections 13 and 14.

Extending longitudinally within section 14 and transversely offset from the center line thereof is a nonreciprocal gyromagnetic attenuator 15. Attenuator 15 is schematically represented by a block. This is to indicate that there are a plurality of gyromagnetic attenuators which may be utilized in section 14. For example, attenuator 15 may be either of the gyromagnetic resonance type or of the field displacement type.

In Fig. 1A there is represented in cross sectional view, a field displacement nonreciprocal attenuator which may be properly utilized in section 14. An efficient field displacement attenuator of this type is disclosed and discussed in detail in the above-mentioned copending application of S. Weisbaum. Briefly considered, the field displacement isolator operates by virtue of the fact that ferrite element 21 thereof nonreciprocally displaces the electric field configuration of the dominant mode for different directions of propagation through the wave guide. For the reverse direction of propagation the electric field intensity will have a substantial value in the region of resistive element 22, while for the forward direction of propagation the ferrite displaces the field such that an electric field null occurs in the region of resistive element 22. Thus, for the forward direction of propagation, there is no attenuation suffered by the wave energy except for the reciprocal loss inherent in the ferrite itself.

Fig. 1B represents the gyromagnetic resonance type attenuator which may illustratively be utilized as attenuator 15 in wave guide section 14 of Fig. 1. Highly efficient nonreciprocal attenuators of this type are disclosed in the above-mentioned copending application of M. T. Weiss. An attenuator of this type operates by applying a static magnetic bias H to ferrite elements 25 of a magnitude sufficient to drive the ferrites into the region of gyromagnetic resonance for radio frequency energy propagating therethrough at the operating frequency. However, because of the asymmetrical location of the ferrite elements in the wave guide and the resultant opposing senses of rotation relative to H which the magnetic vectors of the propagating energy exhibit to the ferrites for opposite directions of propagation through the wave guide, the device is resonant solely for energy propagating in one direction. If the polarity of the biasing field H were reversed, the attenuator would be at resonance for energy propagating in the opposite direction. It may be seen then that energy propagating in the reverse sense through the resonance isolator will undergo considerable attenuation while energy propagating in the forward direction therethrough will only undergo that small reciprocal attenuation which all energy will experience when propagating through a ferrite element whether magnetically biased or not.

Referring back to Fig. 1, therefore, we see that nonreciprocal attenuator 15, which may be either of the type disclosed in Fig. 1A or Fig. 1B, will substantially attenuate the wave energy that propagates through wave guide section 14 in the reverse direction but will only slightly attenuate energy propagating therethrough in the forward direction.

Concomitant with the nonreciprocal attenuation produced by attenuator 15 there is a nonreciprocal phase shift effect. Thus for energy propagating through wave guide section 14, a substantially greater phase shift is experienced by energy propagating in the reverse direction past element 15 than when propagating in the forward direction. As is well known in the art, this nonreciprocal phase shift is manifested whether attenuator 15 is of the resonance or field displacement type. This phase shift plays an important part in the operation of the isolator of Fig. 1. However, it is necessary for the purposes of the invention that the phase shift through section 14 in the forward direction be equal to the phase shift in section 13. Consequently within section 13 there is located a dielectric slab 16 proportioned to compensate the phase shift in section 13 such that it will be equal to the phase shift in section 14 for the forward direction of propagation therein. Unlike attenuator 15, however, dielectric slab 16 will provide essentially no attenuation but will serve solely as a phase shifting compensator.

A qualitative description of the operation of the isolator of Fig. 1 may now be considered. Energy incident in the isolator at end B propagating in the forward direction will divide into two portions between sections 13 and 14. Each portion will pass through elements 15 and 16 respectively and undergo exactly the same phase shift during the propagation from the right-hand end of septum 14 to the left hand end thereof. As a consequence the two portions of the energy will recombine at end A of the isolator exactly in phase and will continue propagating out to the left. The portion of energy propagating through section 14, however, will experience some of the reciprocal attenuation inherent in attenuator 15. This loss is much less than would be the case if all of the energy incident on the isolator were subjected to the attenuator, i.e., since only a portion of the incident energy in the forward direction is operated upon by attenuator 15, the loss in the forward direction, of necessity, is less than would be the case if all the energy incident on the isolator were subject to the reciprocal loss effect of attenuator 15. On the other hand, energy incident on the isolator at end A in the reverse direction of propagation will experience different phase shifts in the two portions thereof propagating respectively through sections 13 and 14 since the phase shift provided by attenuator 15 in the reverse direction is substantially greater than the phase shift provided by the reciprocal dielectric phase compensator in section 13. Furthermore, that portion of the energy propagating through attenuator 15 will experience a substantial degree of attenuation since it is propagating in the lossy direction. In accordance with the invention, then, the two portions of energy on reaching the right-hand end of septum 12 will be out of phase in a special way (as a steady state analysis presented below will indicate), will be redistributed between sections 13 and 14, and will be completely reflected back to the left hand end of septum 14. In this direction of propagation the energy in section 14 will only be slightly attenuated. On reaching the left-hand end of septum 14, the energy of the two portions will be redistributed between sections 13 and 14 and because the same phase relationship prevails at the left-hand end as did at the right-hand end of septum 14, the redistributed energy will then propagate back in the reverse direction as before. Thus the redistributed energy in section 14 now undergoes another substantial amount of attenuation due to the action of attenuator 15. Because of the controlled phase relationships, the reflection and redistribution at the ends of the septum 12 will be cyclicly repeated until all the energy initially incident at end A in the reverse direction will be dissipated by attenuator 15.

This effect results when certain of the parameters of the isolator are in a particular relationship to each other. Specifically there are five critical parameters to be considered. The first is the reciprocal phase shift which occurs in reduced height wave guide 13 and in guide 14 for the forward direction of propagation; the second is the phase shift for the reverse direction in reduced height wave guide 14 containing the nonreciprocal attenuator 15; the third is the attenuation in the ferrite loaded guide 14 for the reverse or high loss direction of propagation; the fourth is the nonreciprocal attenuation experienced by wave energy in the ferrite loaded guide 14 for the forward or low loss direction of propagation; and the fifth is the relative heights $x$ and $y$ of sections 13 and 14, respectively. By properly relating these parameters the device of Fig. 1 substantially approaches the characteristics of an ideal isolator, i.e., infinite attenuation for the reverse direction with substantially zero attenuation for the forward direction. The relationship between these parameters providing this ideal situation will now be investigated.

Fig. 2 constitutes a longitudinal cross section of the isolator of Fig. 1. Reference numerals are accordingly the same. Further, there have been introduced into Fig. 2 certain reference planes. Reference plane 1 located at the left-hand side of the isolator is positioned an integral number of guide wavelengths to the left of reference planes 2 and 3. Reference plane 6 occupies a similar and related position on the right-hand side of the isolator. Reference planes 2 and 3 are planar extensions of each other; reference plane 2 defines a plane in reduced height guide 13 near the left-hand side of conductive septum 12 while reference plane 3 defines a plane for reduced height guide 14 also near the left-hand side of conductive septum 12. Reference planes 4 and 5 are also planar extensions of each other but are for the reduced height guides near the right-hand side of conductive septum 12 with plane 5 defining a plane for guide 13 and plane 4 defining a plane for guide 14. Reference planes 2 through 5 are located at particular points in the wave guides for the purpose of facilitating the mathematical synthesis of the relationship among the above-mentioned parameters. In particular, reference planes 2 and 3 are located at the first standing wave minima that occur respectively at the left in guides 13 and 14 and that would be formed by the sum of an incident wave traveling to the left in guide 13 or 14 and the resultant reflected wave from the discontinuity where the septum is terminated. Planes 4 and 5 similarly are at the first standing wave minima that occur respectively at the right in guides 13 and 14. The precise location of these standing wave minima may be readily determined in a manner well known in the art and disclosed, for example, in the "Waveguide Handbook," by Marcuvitz, Radiation Laboratory Series, volume 10, 1951, page 353. It must be understood, however, that although the reference planes are located at the first standing wave minima at the left and right sides of guides 13 and 14, they may be, if desired, located at other standing wave minima. The discussion that follows is independent of which minimum locations are used.

Reference planes 1 through 6 therefore may be viewed as constituting six separate ports in the overall wave guide isolator and henceforth will be referred to as ports 1 through 6. The designations $a_n$ and $b_n$ represent the voltage waves traveling in the indicated directions with the subscript representing the applicable port. It may be noted that all of the voltage waves designated $a_n$ are for the left to right direction of propagation which is the reverse direction of propagation, while the voltage waves designated $b_n$ represent waves traveling in the direction right to left, the forward direction. It is assumed that all voltages are related to the dominant mode in rectangular wave guides of specific cross sectional dimensions, so that in the following discussion the need to be concerned with changes in impedance level in the circuit is removed. The combined heights of wave guide sections 13 and 14 are considered unity, i.e., $x+y=1$.

With this format, the isolator may be represented in accordance with standard scattering matrix techniques and then subsequently the required relationship among the parameters mentioned above may be demonstrated. The use of scattering matrix representation for wave guide circuits is well known in the art and a general description of this type of representation is presented in standard works, for example, "Waveguide Handbook," by Marcuvitz, Radiation Laboratory Series, volume 10, 1951, pages 106 through 108; and "The Use of Scattering Matrices in Microwave Circuits," by Matthews, IRE Transactions on Microwave Theory and Techniques, April, 1955, page 21. The scattering matrices of the end sections, i.e., for ports 1, 2 and 3 on the one hand, and ports 4, 5 and 6 on the other hand, may be represented as follows:

$$\begin{pmatrix} S_{11} & S_{12} & S_{13} \\ S_{21} & S_{22} & S_{23} \\ S_{31} & S_{32} & S_{33} \end{pmatrix} = \begin{pmatrix} 0 & \sqrt{x} & \sqrt{y} \\ \sqrt{x} & -y & \sqrt{xy} \\ \sqrt{y} & \sqrt{xy} & -x \end{pmatrix} = \begin{pmatrix} S_{66} & S_{65} & S_{64} \\ S_{56} & S_{55} & S_{54} \\ S_{46} & S_{45} & S_{44} \end{pmatrix} \quad (1)$$

The scattering matrices for the center sections, i.e., from ports 2 to 5, on the one hand, and 3 to 4 on the other hand are represented as follows:

$$\begin{pmatrix} 0 & S_{25} \\ S_{52} & 0 \end{pmatrix}$$

and $$\begin{pmatrix} 0 & S_{34} \\ S_{43} & 0 \end{pmatrix} \quad (2)$$

The scattering or transmission coefficient $S_{mn}$ ($m \neq n$) is a measure of the amplitude of the wave scattered into the mth port by an incident wave of unit amplitude in the nth port. Accordingly, $S_{mm}$ represents the reflection coefficient at the mth port when all the other ports are matched. With the scattering matrices thus established each of the various voltage waves $a_n$ and $b_n$ may be established in terms of the scattering coefficients and the other voltage waves. This, as is well known in the art, results in a set of linear simultaneous equations for all the $a_n$ and $b_n$.

Having thus obtained a general representation of the isolator structure, we may now proceed to set into the equations the specific conditions which it has been discovered are necessary to provide a substantially ideal isolator. Thus, for transmission through the reduced height wave guide section 13 the transmission is completely reciprocal, that is, the phase shift from port 2 to 5 experienced by wave energy propagating in that direction will be precisely the same as the phase shift from 5 to 2. Therefore, scattering coefficient $S_{25}$ is equal to scattering coefficient $S_{52}$. The voltage waves at ports 6 and 1, $a_6$ and $a_1$, respectively, for waves initially incident in the reverse direction, may be readily obtained in terms of $x$, $y$, $S_{34}$ and $S_{43}$ and $S_{25}$ by solving the above-mentioned set of linear simultaneous equations which were derived from Equations 1 and 2 above. With $a_6$ and $a_1$ derived, the voltage transmission coefficient $$\frac{a_6}{a_1}$$

is represented by $$\frac{a_6}{a_1} = \frac{S_{25}(1-S_{34}S_{43})x + S_{43}(1-S_{25}^2)y}{1-(S_{34}x+S_{25}y)(S_{43}x+S_{25}y)} \quad (3)$$

It is clear that in order to achieve one of the necessary effects for ideal isolator action, the attenuation in the reverse direction must be infinite and therefore the voltage transmission coefficient $$\frac{a_6}{a_1}$$

must be equal to 0, i.e., for energy propagating from port 1 to port 6 the voltage wave at port 6 must be 0. In order for this to occur, the numerator of Equation 3 must be equal to 0.

We may now represent the three scattering coefficients $S_{25}$, $S_{34}$ and $S_{43}$ in more useful form, i.e., in a form wherein the phase shift and amplitude may be represented. Since $S_{25}$ is the scattering coefficient in lossless guide 3, we may represent it as $S_{25}=e^{-i\varphi}$ where $\varphi$ represents the total phase shift between ports 2 and 5. $S_{34}$ is the transmission coefficient in the ferrite loaded guide 14 for the forward direction and may be represented by $S_{34}=\beta e^{-i\varphi}$. $\beta$ is of course the amplitude coefficient and is determined by the small reciprocal loss inherent in the ferrite. $\varphi$ represents the phase shift from port 4 to 3, that is, for the forward direction, and it may be noted that this is the same as the reciprocal phase shift for the unloaded guide 13 between ports 2 and 5 for both directions of propagation. As indicated above, reciprocal phase shift in guide 13 and the phase shift for the ferrite loaded guide 14 in the forward direction are made equal so that energy initially incident in the isolator in the forward direction will be in phase everywhere in both the reduced height guides 13 and 14. Therefore, this energy will not experience any reflections and will continue propagating through the isolator and out in one pass. $S_{43}$ on the other hand is represented as being equal to $\alpha e^{-i\theta}$. This transmission coefficient is for the ferrite loaded guide 14 for the reverse direction of propagation. Accordingly the amplitude coefficient $\alpha$ is different from $\beta$ since in the reverse direction of propagation the ferrite will attenuate energy to a substantial degree. Therefore $\alpha$ is a function of the total attenuation in the reverse direction in wave guide 14, for one pass, including the sum of the small inherent reciprocal attenuation plus the large nonreciprocal attenuation. In addition to exhibiting nonreciprocal attenuation in the reverse direction, energy transmitted from port 3 to 4 will also experience a phase shift which is different from the phase shift from port 4 to 3, i.e., $\theta$ representing the phase shift in the reverse direction in guide 14, will be different in magnitude from $\varphi$. Substituting these above-defined transmission coefficients into the numerator of Equation 3 for $S_{25}$, $S_{34}$ and $S_{43}$, and isolating the numerator and setting it equal to zero provides us with the following equation:

$$e^{-i\varphi}(1-\beta e^{-i\varphi}\alpha e^{-i\theta})(1-y)+\alpha e^{-i\theta}(1-e^{-i2\varphi})y=0 \quad (4)$$

Equation 4 is made to zero for the reasons indicated above, namely, that in order to have infinite attenuation in the reverse direction the voltage transmission coefficient $$\frac{a_6}{a_1}$$

must be equal to zero and therefore the numerator of Equation 3 must be equal to zero.

With Equation 4 we have the definitive relationship relating the heights of the reduced height guides 13 and 14, the phase shifts for both directions of propagation in both these guides and the attenuation for both directions of propagation. When these parameters are related as described in Equation 4, therefore, we have the ideal isolator which we set out to obtain. In this arrangement, energy initially propagating in the isolator of Fig. 1 in the reverse direction will reflect and redistribute back and forth between the left-hand and right-hand ends of conductive septum 12 until all the energy is dissipated in the nonreciprocal attenuator 15. Energy initially propagating in the forward direction, however, will not be reflected or redistributed at all because Equation 4 includes the condition that for the forward direction of propagation the phase shift from port 4 to 3 is exactly the same as from port 5 to 2. For this reason, Equation 4 provides that energy in guides 13 and 14 will be everywhere in phase for the forward direction of propagation and therefore will pass through the isolator in a single pass without reflection.

We may now visualize the practical fruits of the invention. Immediately below is presented a table which demonstrates the overall reverse and forward loss provided by the isolator of the invention when an attenuator having given forward and reverse losses is inserted in the reduced height wave guide 14.

This table is presented merely to indicate some few examples of the results that may be obtained in accordance with the invention, and is of course controlled by Equation 4. The table is subject to the condition $$\varphi=\frac{\pi}{2}$$

However, other values of $\varphi$ might have been utilized and an ideal isolator would result under the relationship of parameters in Equation 4.

| | Reverse loss in db for attenuator 15 for single pass | Forward loss in db for attenuator 15 | Overall reverse loss in db of the isolator circuit | Overall forward loss in db of the isolator circuit | Loss ratio |
|---|---|---|---|---|---|
| $y=0.5$ | 9.38 | 0.5 | ∞ | 0.26 | ∞ |
|  | 9.48 | 0.3 | ∞ | 0.15 | ∞ |
|  | 9.50 | 0.1 | ∞ | 0.05 | ∞ |
| $y=0.25$ | 4.14 | 0.5 | ∞ | 0.13 | ∞ |
|  | 4.26 | 0.3 | ∞ | 0.08 | ∞ |
|  | 4.38 | 0.1 | ∞ | 0.04 | ∞ |
| $y=0.1$ | 1.34 | 0.5 | ∞ | 0.04 | ∞ |
|  | 1.50 | 0.3 | ∞ | 0.03 | ∞ |
|  | 1.74 | 0.1 | ∞ | 0.01 | ∞ |

Each horizontal row describes a different isolator circuit. It may be noted that the reverse loss (derived from Equation 3) is infinite in every case, as is the loss ratio. The forward loss is also readily determined by interchanging $S_{43}$ and $S_{34}$ in Equation 3 and then solving. It may be noted that the forward loss for the overall isolator circuit is everywhere smaller than the forward loss that the attenuator 15 would provide in an undivided wave guide.

From Equation 4 we may readily derive expressions of great practical utility. Given a microwave circuit comprising a bifurcated wave guide of given reduced height whose bifurcating conductive septum will produce a phase shift $\varphi$ between ports 2 and 5, how can a person skilled in the art ascertain the parameters of a nonreciprocal attenuator to utilize in the wave guide such that the overall structure is an ideal isolator? This is readily derived from Equation 4 which sets forth the required conditions. Solving Equation 4 for $\alpha e^{-i\theta}$ results in $$\alpha e^{-i\theta}=\frac{(1-y)e^{-i\varphi}}{[\beta+(1-\beta)y]e^{-i2\varphi}-y} \quad (5)$$

From this equation $\alpha$ may be determined in a manner well known in the art by multiplying Equation 5 by its complex conjugate and taking the square root of the product, thus $$\alpha=\frac{1-y}{[[\beta+(1-\beta)y]^2+y^2-2y[\beta+(1-\beta)y]\cos 2\varphi]^{1/2}} \quad (6)$$

$\theta$ similarly may be determined by rationalizing Equation 5 and then proceeding directly in a manner well known in the art to obtain $\theta$. We thus obtain $$\theta=-\tan^{-1}\left[\frac{1+\left(\frac{2-\beta}{\beta}\right)y}{1-y}\tan\varphi\right] \quad (7)$$

With $\alpha$ and $\theta$ determined, we therefore know the characteristics of the nonreciprocal attenuator that are necessary to produce an ideal isolator in a given microwave circuit, i.e., given in the same sense that $y$, $\varphi$ and the reciprocal loss of the attenuator are entering arguments.

In similar manner we can likewise determine what kind of microwave circuit would be required to provide an ideal isolator given a particular nonreciprocal attenuator. That is, given an attenuator having specific reverse and forward loss, and reverse phase shift, what would be the values of $\varphi$ and $y$ required to provide an ideal isolator? In practice this would be the more probable question to be solved in designing an ideal isolator. That is, it is more probable that the attenuator is on hand and the wave guide must be designed. This may be obtained straightforwardly. Substituting Equations 6 and 7 into $S_{43}=\alpha e^{-i\theta}$, and then solving to obtain an expression relating $\varphi$, $\alpha$, $\beta$, and $\theta$ yields $$\pm\cos\theta=\alpha\beta\cos\varphi \quad (8)$$

Since the cosine of any function may be less than or equal to plus or minus 1, it follows directly from Equation 8 that $$\frac{|\cos\theta|}{\alpha\beta}\leq 1 \quad (9)$$

If the attenuator satisfies the conditions of expression 9, then it is possible to construct an ideal isolator by utilizing Equation 4 and the appropriate values of $\varphi$ and $y$ may be obtained therefrom. On the other hand, if a given attenuator does not satisfy expression 9 with respect to phase shift and attenuation in the reverse direction and attenuation in the forward direction, an ideal isolator could not possibly be obtained. That is, no microwave circuit could be developed (no combination of $\varphi$ and $y$ exists) which will satisfy Equation 4 and therefore it is impossible to develop an ideal isolator with the given attenuator. Considered from another viewpoint, any dissipative isolator in existence which meets the requirement of expression 9 may be made substantially ideal by providing a bridging path across it, if the values $\varphi$ and $x$ of the bridging path are proportioned to satisfy Equation 4. Although the values of $x$ and $y$ have been viewed primarily as the relative heights of sections 13 and 14, they equally represent, as indicated above, the relative division of energy between bridging section 13 and section 14.

As discussed above, in order to get infinite attenuation in the reverse direction, the numerator of Equation 3 must be equal to zero and therefore Equation 4 is set equal to zero. It is, however, an additional and necessary condition for operability that when the numerator of Equation 3 is equal to zero, the denominator be different from zero. This condition was not previously discussed above for the simple reason that the denominator of (3) must of necessity be different from zero. Investigation will demonstrate that the only way for the denominator to be equal to zero is if $\alpha$ is greater than 1, except when $\beta$ is equal to 1. This is clearly impossible since $\alpha$ can never be greater than 1 and $\beta$ can never be equal to 1. $\alpha$ and $\beta$ were defined above as $S_{34} = \beta e^{-i\varphi}$ and $S_{43} = \alpha e^{-i\theta}$. These are the transmission coefficients for the forward and reverse directions of propagation in the attenuator loaded reduced height guide 14. Since the attenuator always has some inherent loss in the forward direction, $\beta$ can never be equal to 1 and since the attenuator has even greater loss in the reverse direction $\alpha$ must be less than $\beta$. Therefore under no real circumstances can $\alpha$ be greater than or equal to 1. It follows, therefore, that the denominator of Equation 3 can not possibly be equal to zero.

We will now consider the applications of the principles of the invention to a nonreciprocal phase shifter rather than to an isolator. Thus, the principles of the invention are applied for the purpose of enhancing nonreciprocal phase shift. In this embodiment of the invention, the nonreciprocal gyromagnetic element of Fig. 1 is a phase shifter (rather than an attenuator) which may be of the type represented by Fig. 1C. Fig. 1C is a cross sectional view of a ferrite phase shifter well known in the art wherein ferrite material is located transversely offset from the center line of the wave guide in regions wherein the magnetic vectors of the R.-F. energy rotate in one angular sense for energy propagating in one direction through the guide and rotate in the opposite angular sense of energy propagating in the opposite direction therethrough. The magnetic field H biasing the ferrite material is at a level outside the region of gyromagnetic resonance wherein maximum nonreciprocal phase shift is produced. The structure of Fig. 1C is essentially similar to that of Fig. 1B except that the strength of the biasing field H in Fig. 1B is at resonance while the strength of the biasing field H in Fig. 1C is outside resonance. In this biasing region, i.e., the region outside of resonance, the ferrite material does not exhibit nonreciprocal attenuation and the only loss that would be introduced by the ferrite material is the small amount of reciprocal loss discussed above. By incorporating the phase shifter of Fig. 1C into Fig. 1 as nonreciprocal gyromagnetic element 15, the basic structure is accomplished.

Now, however, although Equations 1 through 3 are still applicable to the structure the equations subsequent thereto, pertinent to the isolator, are no longer applicable. The voltage transmission coefficient $S_{34}$ may be represented as $S_{34} = e^{-i\varphi}$, and $S_{43}$ the voltage transmission coefficient for the opposite direction of propagation in section 14 may be represented as $S_{43} = e^{-i(\varphi+\delta)}$. This representation incorporates the nonreciprocal phase shift characteristics of element 15. Thus for propagation to port 3 from port 4 the phase shift therebetween is described by $\varphi$. For transmission in the reverse direction, i.e., to port 4 from port 3 the phase shift is described by $\varphi+\delta$. $\varphi$ in both cases is the reciprocal phase shift experienced for wave energy propagating in section 14 while $\delta$ represents the additional nonreciprocal phase shift experienced by energy propagating solely in the reverse direction in section 14.

The voltage transmission coefficient for transmission from port 1 to port 6, i.e., Equation 3, may then be generally represented by $$\frac{a_6}{a_1} = e^{-i(\varphi+\delta')} \qquad (10)$$

where $\delta'$ represents the excess nonreciprocal phase shift for the reverse direction of propagation through the entire structure, i.e., from port 1 to port 6 (it may be recalled that $\delta$ represents the excess nonreciprocal phase shift in the reverse direction from port 3 to port 4). Since the primary consideration of the structure of Fig. 1 operated as a phase shifter is the nonreciprocal phase shift, expressions representing the loss of the system have not been included in Equation 10. However, it is unavoidable that some loss will exist in the system due to the small inherent reciprocal loss of the ferrite element. Recognizing that $S_{25}$ is equal to $S_{34}$ in this arrangement an expression may then be determined for $\delta'$ from Equation 3.

$$\delta' = \arctan \frac{y[\sin 2\varphi + \sin \delta - \sin(2\varphi+\delta)] - y^2 \sin 2\varphi(1-\cos \delta)}{1-\cos(2\varphi+\delta)+y[\cos(2\varphi+\delta)-\cos 2\varphi+\cos \delta-1]+y^2 \cos 2\varphi(1-\cos \delta)} \qquad (11)$$

Thus it may be seen that Equation 11 determines a structure of the invention such that for a given nonreciprocal phase shifter inserted in the microwave circuit an overall excess phase shift $\delta'$ for the reverse direction of propagation results from given values of $\varphi$, $y$ and $\delta$. Conversely, to provide a given overall nonreciprocal excess phase shift for the device of Fig. 1, values of $\varphi$, $y$ and $\delta$ may be selected to provide a given $\delta'$.

One of the most practical phase shifting arrangements of Fig. 1 is one wherein it operates as a gyrator, i.e., $\delta'$ is equal to 180 degrees, and wherein $\delta$ is some value smaller than 180 degrees. Under these conditions Equation 11 reduces as it must to $\delta'=0$ when $y=0$, and $\delta'=\delta$ when $y=1$. A necessary condition that $\delta'=\pi$ somewhere in the range $0 \leq y \leq 1$ is that the numerator of the argument of the arctangent of (11) have a root other than $y=0$ in this range. To insure this, $$0 < y = \frac{\sin 2\varphi(1-\cos \delta) + \sin \delta(1-\cos 2\varphi)}{\sin 2\varphi(1-\cos \delta)} < 1 \qquad (12)$$

or $$-1 < \tan \varphi \cot \frac{\delta}{2} < 0 \qquad (13)$$

Thus, if $\delta$ is between zero and $\pi$, then $\varphi$ must lie between $$n\pi - \frac{\delta}{2}$$

and $n\pi$ where $n$ is any integer.

That (13) is also a sufficient condition to guarantee a gyrator for some value of $y$ can be shown by considering the behavior of the denominator of the argument of the arctangent in (11). Since the constant term here, $1-\cos(2\varphi+\delta)$, is always positive, and since the denominator has at most two real roots, it is only necessary to prove that the denominator is negative when $y$ takes on that value which satisfies (12). This will mean that in the range from $y=0$ up to the value which causes the numerator to vanish, the denominator has passed through zero exactly once, and thus $\delta'=\pi$ when $y$ satisfies (12). Substituting (12) into the denominator of the arctangent of (11), and rearranging terms yields the expression $$-\sin^2 \delta \left(\tan \varphi + \tan \frac{\delta}{2}\right)^2 \left(\frac{1-\cos 2\varphi}{1-\cos \delta}\right) \quad (14)$$

which is always negative regardless of whether (13) is satisfied or not.

If the first term in the numerator in (12) is required to be negative so that $\delta'$ must start into the fourth quadrant when $y$ increases from zero, and if $\delta$ is required to lie in the third or fourth quadrants, then it develops that $$\tan \varphi \cot \frac{\delta}{2}$$

is outside of the range zero to minus one. Condition (13) is thus not satisfied, and the only solutions which have been found are those for which $\delta'$ proceeds monotonically from zero to $\delta$ as $y$ goes from zero to one, never going through $\delta'=\pi$. The same holds true if $\delta'$ is made to start into the first quadrant and $\delta$ is required to lie in the first or second quadrants.

In the above-preferred embodiments of an isolator and a phase shifter, the phase shifts through sections 13 and 14 are identical for the forward direction of propagation. This is a necessary condition for the ideal isolator. However, this is not a necessary condition for the phase shifter although it results in simplified design considerations. Thus the phase compensator 16 in the phase shifter embodiment need not necessarily balance the phase shift in section 14 for the forward direction, and element 16 may even be of ferrite material rather than a relatively lossless dielectric. Furthermore, it is to be understood that the above-described arrangements are merely illustrative of applications of the principles of the invention. Numerous and varied other arrangements can readily be devised in accordance with those principles by those skilled in the art without departing from the spirit and scope of the invention.

What is claimed is:

1. In combination, a wave guide supportive of electromagnetic wave energy, a nonreciprocal wave transmission means including a gyromagnetic element located in a section of said wave guide, and means comprising a conductive septum coupled to said section to divide said section into two longitudinally extending portions and for multiplying reflecting wave energy from each end of said section when said reflected wave energy is initially incident upon said section solely at one given end thereof, said element being disposed in one of said longitudinally extending portions.

2. A combination as recited in claim 1, wherein said means coupled to said section includes a wave guiding path bridging said gyromagnetic element.

3. A combination as recited in claim 2 wherein said wave guide is a rectangular, hollow, conductive pipe and wherein said bridging path is formed by a longitudinally extending thin conductive septum within said guide bifurcating said guide and determining the length of said section, said gyromagnetic element being disposed on the opposite side of said septum from said bridging path.

4. A combination as recited in claim 3 wherein said nonreciprocal means is a nonreciprocal phase shifter.

5. A combination as recited in claim 4 wherein said nonreciprocal transmission means is additionally a nonreciprocal attenuator, whereby isolator action is provided.

6. A nonreciprocal electromagnetic wave transmission component comprising a rectangular conductive wave guide, a thin conductive septum extending across said guide parallel to a wall thereof, said septum bifurcating said wave guide into first and second longitudinally extending reduced height wave guiding sections, a nonreciprocal phase shifting means located in said first section, a reciprocal phase compensating element located in said second section, said nonreciprocal phase shifting means and said reciprocal phase compensating element being proportioned to provide the same amount of phase shift in each of said first and second sections solely for wave energy propagating therethrough in a first direction while providing different amounts of phase shift in said first and second sections, respectively, for energy propagating therethrough in a second direction opposite to said first direction, the relative dimensions of said first and second sections in a direction perpendicular to said bifurcating septum and the magnitudes of phase shift provided by said nonreciprocal and reciprocal means being mutually proportioned to provide multiple reflections from each end of said septum solely for wave energy initially entering said wave component at one given end thereof.

7. An isolator comprising a combination as recited in claim 6 wherein said nonreciprocal phase shifting means is additionally a nonreciprocal attenuator having a nonreciprocal loss characteristic for energy propagating through said first section, the parameter $\alpha$ being a function of the attenuation provided by said nonreciprocal means for wave energy propagating through said first section in said second direction, the parameter $\beta$ being a function of the attenuation provided by said nonreciprocal means for wave energy propagating through said first section in said first direction, the parameters of said wave transmission component satisfying the expression $$\frac{|\cos \theta|}{\alpha \beta} \leq 1$$

wherein $\theta$ is a function of the phase shift provided by said nonreciprocal means in said first section for wave energy propagating in said second direction.

8. A combination as recited in claim 7 wherein the parameters of said wave transmission component additionally satisfy the condition $$e^{-i\varphi}[1-\alpha\beta e^{-i(\varphi+\theta)}]x + \alpha e^{-i\theta}(1-e^{-i2\varphi})y = 0$$

wherein $\varphi$ is a function of the phase shift through said first section for said first direction of propagation and through said second section for both directions of propagation and wherein $x$ and $y$ represent said relative dimensions for said second and first sections, respectively, defining in turn a relative division of wave energy between said sections caused by said bifurcating septum.

9. A gyrator comprising a wave transmission component as recited in claim 6 wherein the parameters of said wave transmission component satisfy the expression $$-1 < \tan \varphi \cot \frac{\delta}{2} < 0$$

wherein $\delta$ is a function of the difference between phase shifts in said first section for opposite directions of wave propagation therethrough and $\varphi$ is a function of said phase shift in said first section for wave energy propagating in said first direction.

10. A differential phase shifter comprising a wave transmission component as recited in claim 6 for providing a zero overall excess phase shift in said phase shifter for the forward direction of propagation through said component and an overall excess phase shift of $\delta'$ for the reverse direction, wherein the parameters of said component are proportioned substantially according to the relationship $$\delta' = \arctan \frac{y[\sin 2\varphi + \sin \delta - \sin (2\varphi+\delta)] - y^2 \sin 2\varphi(1-\cos \delta)}{1-\cos (2\varphi+\delta) + y[\cos (2\varphi+\delta) - \cos 2\varphi + \cos \delta - 1] + y^2 \cos 2\varphi(1-\cos \delta)}$$

where $\varphi$ is a function of the phase shift for wave transmission through said first section in said first direction and $(\varphi+\delta)$ is a function of the phase shift for wave transmission through said first section in said second direction.

11. In combination, a wave guide supportive of electromagnetic wave energy, a nonreciprocal wave transmission means including a gyromagnetic element located in a section of said wave guide, and means coupled to said section for multiplying reflecting wave energy from each end of said section when said reflected wave energy is initially incident upon said section solely at one given end thereof, said last-named means comprising a wave guiding path bridging said gyromagnetic element.

References Cited in the file of this patent

UNITED STATES PATENTS

| | | |
|---|---|---|
| 2,748,353 | Hogan | May 29, 1956 |
| 2,760,166 | Fox | Aug. 21, 1956 |
| 2,777,906 | Shockley | Jan. 15, 1957 |
| 2,792,551 | Smith | May 14, 1957 |
| 2,866,949 | Tillotson | Dec. 30, 1958 |

OTHER REFERENCES

Fox et al.: The Bell System Technical Journal, vol. 34, No. 1, Jan. 1955, pages 42–72.

"Waveguide Handbook," by Marcuvitz, Radiation Laboratory Series, vol. 10, 1951, page 353.